United States Patent
Sharma et al.

(10) Patent No.: US 10,269,224 B2
(45) Date of Patent: Apr. 23, 2019

(54) RESIDENTIAL SECURITY USING GAME PLATFORM

(71) Applicant: SENSORMATIC ELECTRONICS, LLC, Boca Raton, FL (US)

(72) Inventors: Amit Kumar Sharma, Bangalore (IN); Yatishkumar Ravinath Pokale, Bangalore (IN); B. Parthasarathy, Bangalore (IN)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 79 days.

(21) Appl. No.: 14/496,050

(22) Filed: Sep. 25, 2014

(65) Prior Publication Data
US 2016/0093176 A1    Mar. 31, 2016

(51) Int. Cl.
| | | |
|---|---|---|
| G08B 13/00 | (2006.01) | |
| G08B 5/00 | (2006.01) | |
| G08B 25/14 | (2006.01) | |
| H04M 11/02 | (2006.01) | |
| G08B 25/00 | (2006.01) | |

(52) U.S. Cl.
CPC .............. *G08B 13/00* (2013.01); *G08B 5/00* (2013.01); *G08B 25/14* (2013.01); *H04M 11/025* (2013.01); *G08B 25/001* (2013.01)

(58) Field of Classification Search
CPC ...... G08B 25/008; G08B 25/14; G08B 13/00; G08B 13/19684; G08B 5/00; H04N 7/181
See application file for complete search history.

(56) References Cited

U.S. PATENT DOCUMENTS

| | | | | |
|---|---|---|---|---|
| 8,456,293 B1 * | 6/2013 | Trundle | ............. | G08B 21/0423 340/517 |
| 8,493,202 B1 | 7/2013 | Trundle | | |
| 8,520,072 B1 * | 8/2013 | Slavin | .............. | G08B 13/19684 348/143 |
| 8,525,665 B1 * | 9/2013 | Trundle | ............. | G08B 21/0423 340/517 |
| 8,659,417 B1 * | 2/2014 | Trundle | ............. | G08B 21/0423 340/517 |
| 8,675,071 B1 * | 3/2014 | Slavin | .................... | H04M 11/04 348/143 |
| 8,810,657 B1 * | 8/2014 | Slavin | .............. | G08B 13/19684 348/143 |
| 8,937,661 B1 * | 1/2015 | Slavin | .............. | G08B 13/19684 348/143 |

(Continued)

FOREIGN PATENT DOCUMENTS

GB    2496196 A    8/2013

OTHER PUBLICATIONS

International Search Report & Written Opinion, PCT/US15/51852.
(Continued)

*Primary Examiner* — Orlando Bousono
(74) *Attorney, Agent, or Firm* — Foley & Lardner LLP (57) ABSTRACT

A security system includes sensor devices, a security panel that receives signals from the sensor devices and that executes algorithms to determine the presence of an alarm that is sent to a game console coupled to a monitor. The game console includes a processor and memory, a graphics processor, and a network interface that receives data from the security panel and causes a message regarding the alarm condition to be displayed on the monitor.

20 Claims, 8 Drawing Sheets

(56) References Cited

U.S. PATENT DOCUMENTS

| | | | |
|---|---|---|---|
| 9,171,321 B1* | 10/2015 | Trundle | G08B 21/0423 |
| 2002/0147982 A1* | 10/2002 | Naidoo | G08B 13/19645 |
| | | | 725/105 |
| 2003/0062997 A1* | 4/2003 | Naidoo | G08B 13/19656 |
| | | | 340/531 |
| 2003/0117280 A1* | 6/2003 | Prehn | G08B 13/19656 |
| | | | 340/540 |
| 2004/0113770 A1* | 6/2004 | Falk | G08B 13/19645 |
| | | | 340/531 |
| 2005/0239545 A1* | 10/2005 | Rowe | G07F 17/32 |
| | | | 463/29 |
| 2006/0293100 A1* | 12/2006 | Walter | A63F 13/12 |
| | | | 463/30 |
| 2006/0294565 A1* | 12/2006 | Walter | A63F 13/12 |
| | | | 725/108 |
| 2007/0290830 A1* | 12/2007 | Gurley | G08B 13/1968 |
| | | | 340/506 |
| 2008/0272910 A1 | 11/2008 | Anderson | |
| 2009/0022362 A1 | 1/2009 | Gagvani | |
| 2011/0057796 A1* | 3/2011 | Candelore | G08B 25/14 |
| | | | 340/565 |
| 2011/0254680 A1* | 10/2011 | Perkinson | G08B 25/14 |
| | | | 340/506 |
| 2011/0254681 A1* | 10/2011 | Perkinson | G08B 25/14 |
| | | | 340/506 |
| 2012/0066707 A1* | 3/2012 | Poder | G08B 25/008 |
| | | | 725/14 |
| 2012/0084857 A1* | 4/2012 | Hubner | G08B 25/001 |
| | | | 726/22 |
| 2012/0169487 A1* | 7/2012 | Poder | B60R 25/102 |
| | | | 340/426.15 |
| 2014/0232861 A1* | 8/2014 | Naidoo | H04N 7/18 |
| | | | 348/143 |
| 2014/0253321 A1* | 9/2014 | Srinivasan | G08B 13/00 |
| | | | 340/539.11 |
| 2014/0266681 A1* | 9/2014 | Dunn | G08B 26/00 |
| | | | 340/517 |
| 2014/0266699 A1* | 9/2014 | Poder | G08B 25/001 |
| | | | 340/539.13 |
| 2015/0033246 A1* | 1/2015 | Gideon | H04N 21/25883 |
| | | | 725/12 |
| 2015/0102922 A1* | 4/2015 | Witmer | G08B 13/00 |
| | | | 340/527 |
| 2015/0172602 A9* | 6/2015 | Naidoo | H04N 7/18 |
| | | | 348/143 |
| 2015/0254950 A1* | 9/2015 | Patterson | G08B 13/00 |
| | | | 340/541 |
| 2015/0254972 A1* | 9/2015 | Patterson | G08B 29/185 |
| | | | 340/545.1 |
| 2015/0332585 A1* | 11/2015 | H. M. | G08B 29/185 |
| | | | 704/225 |

OTHER PUBLICATIONS

U.S. Appl. No. 15/235,451, filed Aug. 12, 2016; entitled "Notification System for Virtual Reality Devices", Jason L. Long.

* cited by examiner

RESIDENTIAL SECURITY USING GAME PLATFORM

BACKGROUND

This disclosure relates to game consoles useful for low cost residential and commercial systems such as security systems.

It is common for businesses and homeowners to have a security system for detecting alarm conditions at their premises and signaling the conditions to a monitoring station or to authorized users of the security system. Generally, a user can access a security system to control the security system by directly interacting with hardware, e.g., a control panel associated with the security system. Alternatively or additionally, the user can also access the security system through a user device that is not part of the security system, e.g., a portable handheld device. Such a handheld device can be mobile devices including smart phones, tablets, laptops, etc., that executes one or more applications to access/control the security system.

SUMMARY

One platform that is in common, world-wide ownership is a game console. One example is Xbox One® (Microsoft) that has worldwide sales. Other game consoles include Wii® (Nintendo) and PlayStation® (Sony). Due to the ubiquitous presence of such game consoles, such consoles could be used to provide better service and security solutions for residential users, especially where costs are a significant consideration, especially when such customers already possess such game consoles.

Users are dependent on service providers to handle and monitor security systems installed on their premises. A service provider also has a challenge of providing a high level of quality service around the clock with regular improvement in such service. One perplexing problem with security systems is false alarms. Typically, a security system includes an intrusion or security panel that receives various sensor signals. Often the panels cannot determine from the signals sent by the sensors whether a valid condition exists. These limitations are significant causes of false alarms that can cost alarm monitoring companies, building owners, security professionals and police departments significant amounts of money and wasted time that would otherwise be spent on real intrusion situations.

According to an aspect, a security system includes a plurality of sensor devices that detect various environmental conditions in a premises, a security panel coupled to plural sensors that received signals from the sensor devices and that executes one or more algorithms to determine the presence of an alarm condition based on the various environmental conditions detected by the plural sensors in the premises, a monitor device to display information to a user, and a game console coupled to the monitor, the game console including a processor and memory, a graphics processor, and a network interface, which receives data from the security panel and causes a message regarding the alarm condition to be displayed on the monitor.

Aspects also include methods executed by the panel/game console and computer program products tangibly stored on computer hardware devices that are computer memories, RAM (random access memory), ROM (read only memory, PROM (programmable read only memory, including flash memory), etc. and storage systems that are semiconductor and/or optically and magnetic of ferroelectric based.

With game consoles, the existence of such game consoles can be used to provide better service and security solutions for residential users. These aspects enable users to acknowledge presence of an alarm condition while the service providers handle and monitor. However, the game consoles can improve handling of false alarms, by enhancing the usability of intrusion detection systems, fire alarm systems and video surveillance systems by having these devices, interface through the game console.

While a user may busy playing games/watching television and might miss low priority notifications from alarm systems displayed on a panel keypad or a mobile device. Game consoles offer the ability to control alarms received from home intrusion detection systems by using voice and gesture commands and offers connections to other game consoles, so that in case of an absence of the user, the alarms could be pushed to the online friends.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
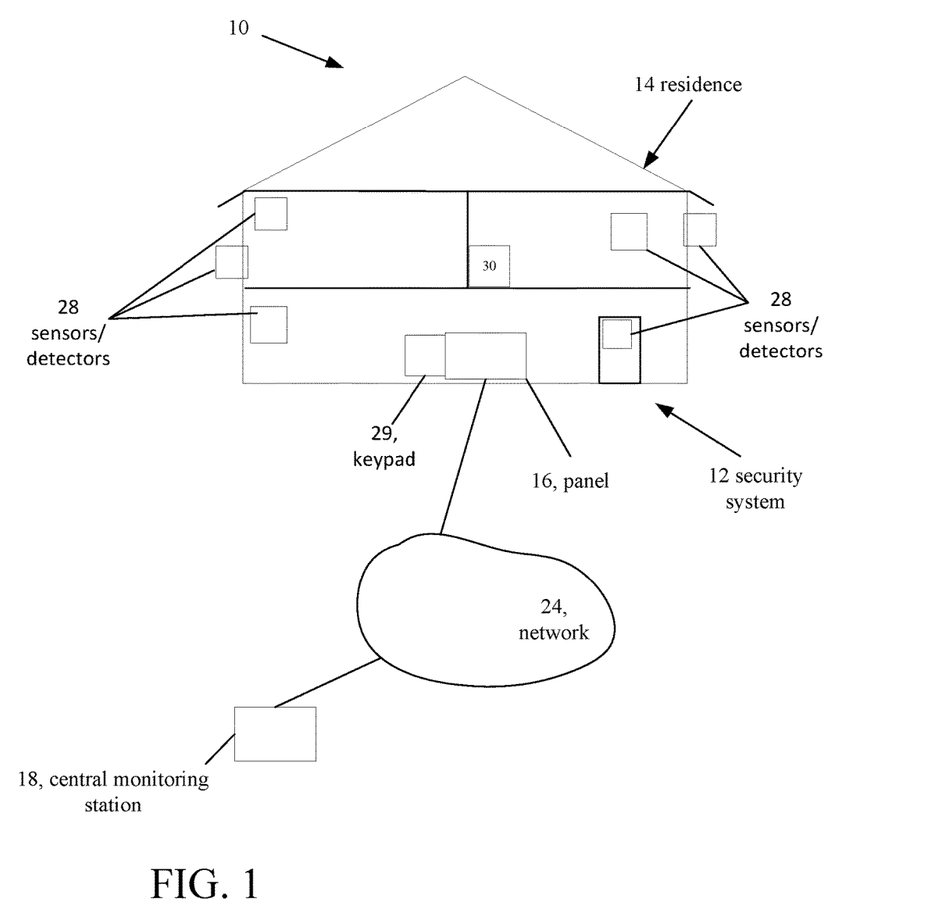
FIG. 1 is a block diagram of a typical installation of a security system at a residence.

Referring now to FIG. 1, an example embodiment 10 of a security system 12 installed at a building, e.g., a residence 14 is shown. In this example, the building is a residential house, but the building may alternatively be any type of building, e.g., commercial, industrial, etc. especially where low costs are a consideration. The security system 12 includes a panel 16 and sensors/detectors 28 disbursed throughout the premises 14. The security system 12 is in communication with a central monitoring station 18 (also referred to as monitoring station 18) via one or more data or communication networks 24 (only one shown), such as the Internet; the phone system or cellular communication system being examples of others. The panel 16 receives signals from plural detectors/sensors (generally referred to as 28) that send to the panel 16 information about the status of the monitored premises. Several types of sensor/detectors (unless otherwise noted are used interchangeably herein) are used. Examples of detectors 28 include glass break detectors and contact switches other detectors include microphones, motion detectors, smart switches and cameras, as well as smoke, fire and heat detectors.

The detectors 28 may be hard wired to the panel 16 or may communicate with the panel 16 wirelessly. In general, detectors 28 sense glass breakage, motion, gas leaks, fire, and/or breach of an entry point, and send data to the panel 16. Based on the information received from the detectors 28, the panel 16 determines whether to trigger alarms, e.g., by triggering one or more sirens (not shown) at the premise 14 and/or sending alarm messages to the monitoring station 18.

In some implementations the panel 16 produces messages whereas in others the panel 16 merely forwards raw sensor data to the monitoring station 18.

A user may access the panel 16 to control the security system, e.g., disarm the system, arm the system, enter predetermined standards for the panel 16 to trigger the alarms, stop the alarms that have been triggered, add new detectors, change detector settings, view the monitoring status in real time, etc. The access can be made directly at the premise 14, e.g., through a keypad 29 connected to the panel.

In implementations described herein conditions at the panel 16 are detected and or raw sensor data is also transmitted to a user's game console 30. Through the game console 30 the panel 16 sends signals to a user's television or monitor connected to the game console 30.

Figure 2:
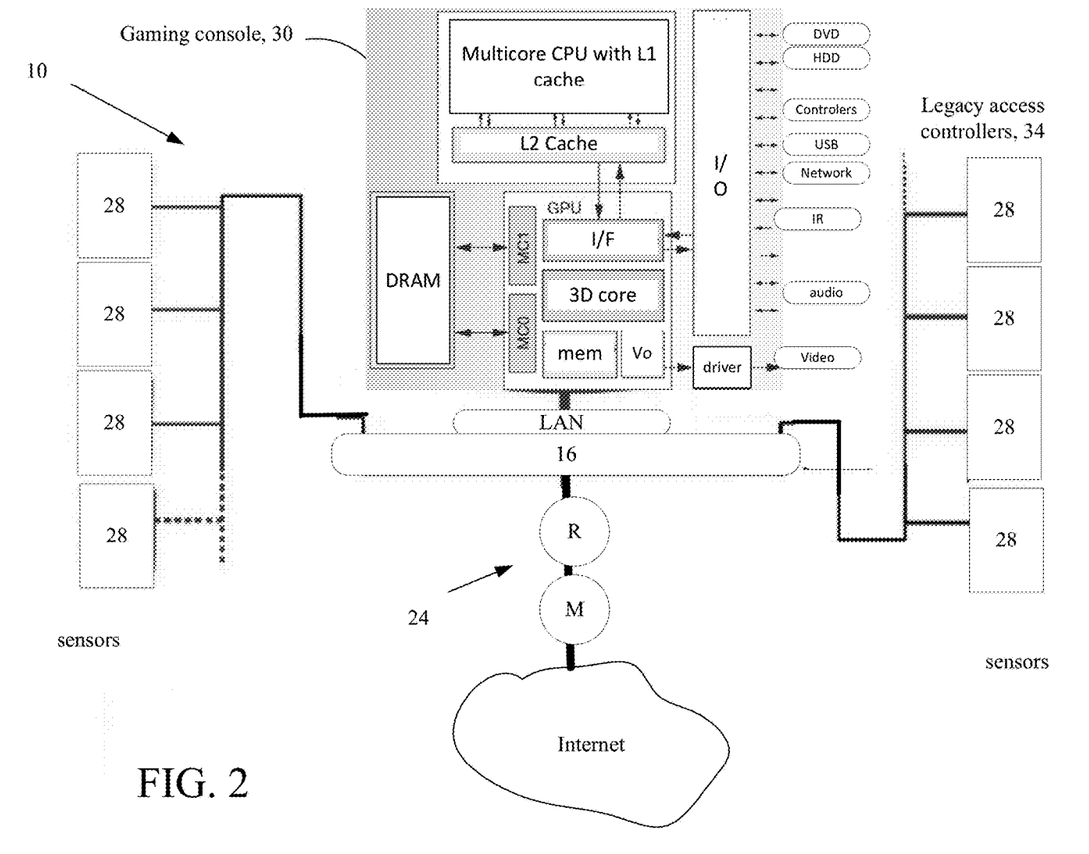
FIG. 2 is a diagrammatical view of the security system.

Referring now also to FIG. 2, the security system 10 includes the sensors 28 that feed panel 16 and the game console 30 coupled to a monitor or television (not shown). The panel is coupled to communication network 24 that includes a router, modem, firewall (not illustrated), etc. or any combination of wired and wireless links capable of carrying packet and/or switched traffic over a network such as the public Internet.

The game console includes a multi-core CPU with L1 cache memories and an L2 cache memory, DRAM a graphics processor GPU various interfaces and I/O ports to controllers, DVD players, HDD outputs, a USB connection as well as a network connection, video and audio, as generally shown.

The panel 16 may be in communication with the network 24 by way of an Ethernet switch or router "R" and DSL/cable modems "M." The panel 16 may therefore include an Ethernet or similar interface, which may be wired or wireless. Further other network components, such as access points, switches, and the like interconnecting the panel 16 with the data network 24 may be used.

Figure 3:
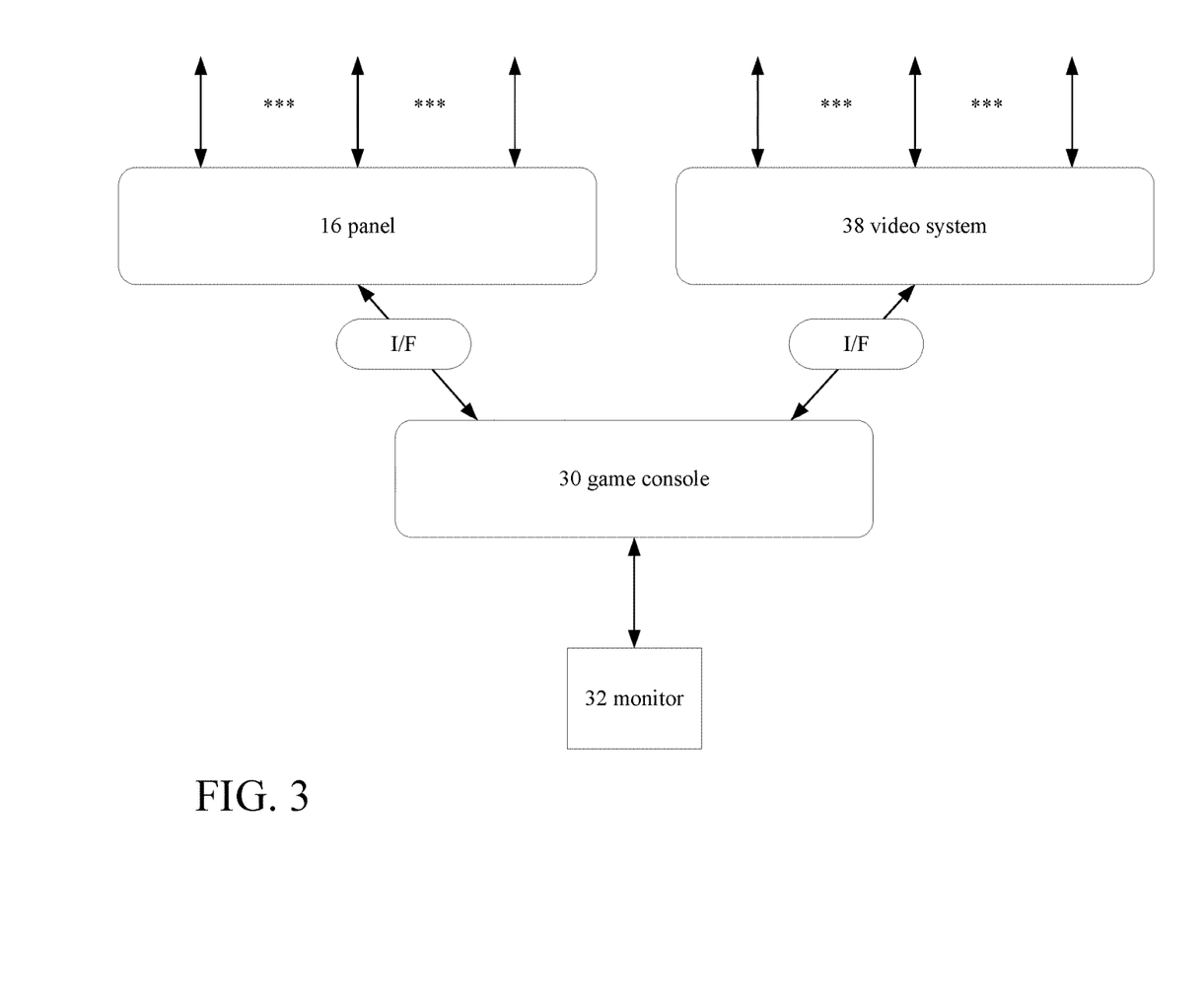
FIG. 3 is diagrammatical architectural view of an exemplary security system configuration.

Referring now to FIG. 3, an architectural view of the security system 10 is shown with the panel 16, game console 30, and video system 38. This particular implementation of the security system 10 has the panel 16 receiving inputs from sensors (and possibly being in two-way communication with the sensors 28) and the video system 38, both feeding data to the game console 30. The panel 16 feeds alarm conditions that the panel 16 has determined exists from the raw input data received by the panel 16 from the sensors 28, whereas, the video systems will feed video information to the game console 30 from cameras etc. that are dispersed in the residence. The game console 30 is coupled to a monitor (or television) 32.

The game console 30 runs an application that allows the game console 30 to receive the data from the control panel 16 and display messages on the monitor 32 when an alarm condition exists. In some implementations, interfaces 37 are provided between the panel 16 and the game console 30 to convert data to a logical and physical format that can be accepted by the game console 30. In other implementations, depending on the panel 16 and game console 30 this conversion could be accomplished in either one of those devices or may not be necessary. Details on the interfaces 37 therefore would be application specific.

Figure 4:
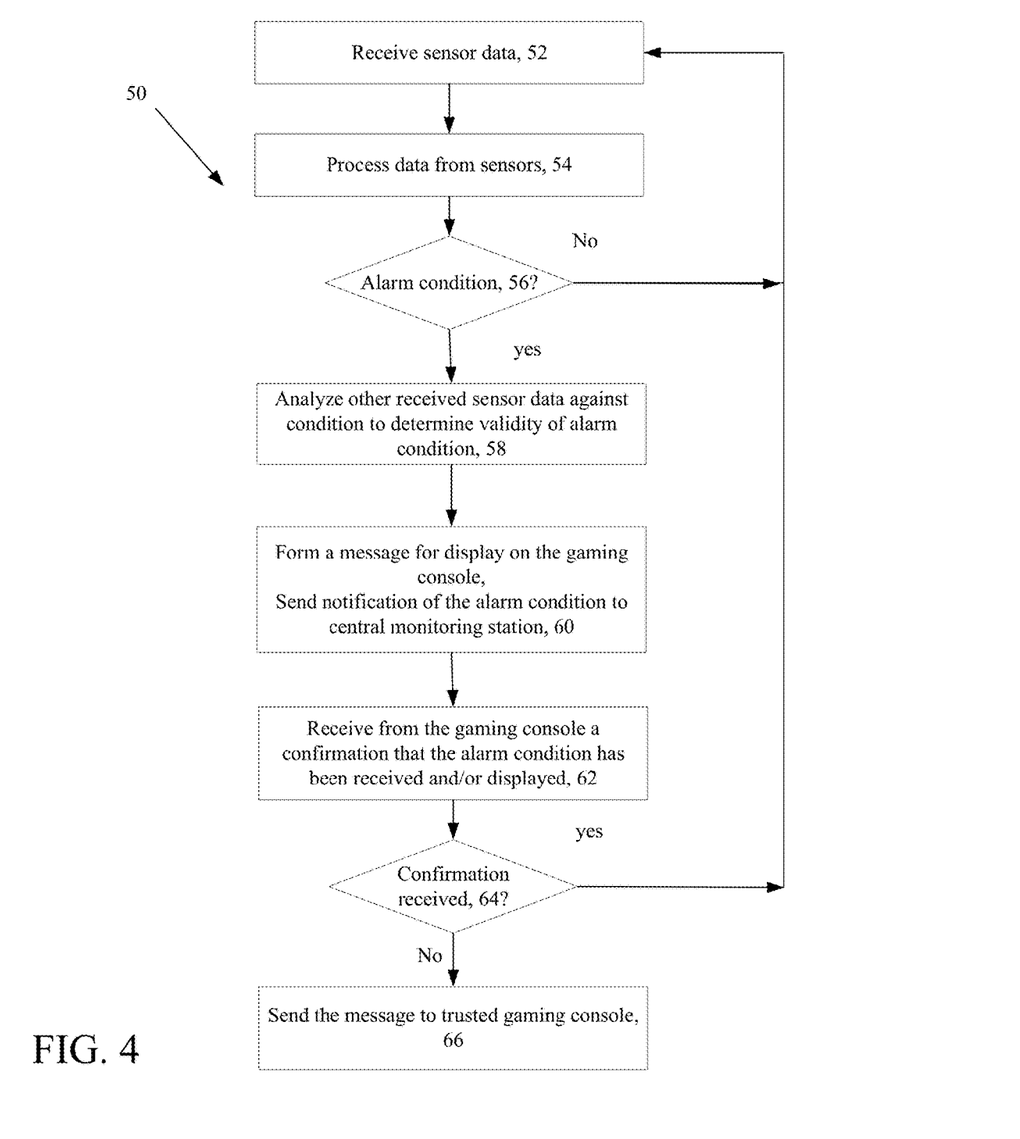
FIGS. 4-6 are flow charts of application processes executing on a security system panel and game consoles.

Referring now to FIG. 4, an application 50 that executes on the panel 16 receives 52 sensor data from various sensors 28 and continually processes 54 that data from the sensors to detect the presence of an alarm condition. Alarm conditions can be various conditions such as a break glass detector firing a signal or a smoke or heat detector firing. Upon detection 56 of an alarm condition, the panel 16 in some implementations may analyze 58 other received sensor data against the determined condition to determine the validity of the detected alarm condition. In either event, the panel 16 will send 60 a message that is a notification to the monitoring station 18. In some implementations the panel will form a special message for display by the game console. This message can be more detailed or less detailed than the message sent to the monitoring station. For example, the message can identify the alarm condition by its location in the residence rather than by what sensor triggered. On the other hand the message can be the same as that sent to the monitoring station 18.

In some implementations, the application 50 can be configured to expect a confirmation message 64 from the game console that the message was received by the console and/or displayed on the monitor/television 32 (FIG. 3). If the confirmation was not received, the application 50 can be configured to send 66 a message to a game console (see FIG. 7) of a nearby user that is trusted by a person occupying the residence 12. If the confirmation was received, the application 50 can be configured to continue receiving for alarm conditions.

In other implementations (not shown), whether or not the confirmation message is received from the game console (indicating that the message was received by the console and/or displayed on the monitor/television 32), the application 50 automatically sends a message to the game consoles of trusted users.

Figure 5:
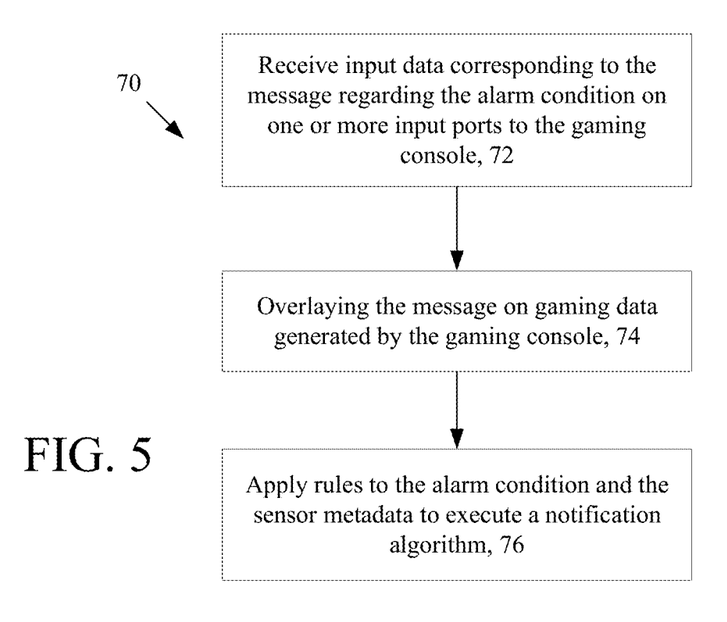

Referring now to FIG. 5, the game console 30 likewise executes an application 70. The application 70 in some implementations discovers IP addressable hardware of various devices coupled to the console, receives 72 input data corresponding to the message generated by the panel 16 regarding the alarm condition. In some implementations the application rather than receiving messages can receive the raw sensor data with or without the messages generated by the panel 16. In other implementations messages are sent from the monitoring station 18.

In any event, the received/generated message(s) and/or raw sensor data are received on one or more input ports of the game console 30. Typically, this port is a network port interface but could be another port. The game console 30 using the application 70 cause the data to be written to the graphics processor unit where it will be overlaid 74 with other data being processed by the graphics processor unit of the game console 30, such as entertainment data. This overlaid data corresponds to the message generated by the panel 16. The application 50 can apply rules 76 to the alarm condition that can execute a notification algorithm or take other action based on user input.

Figure 6:
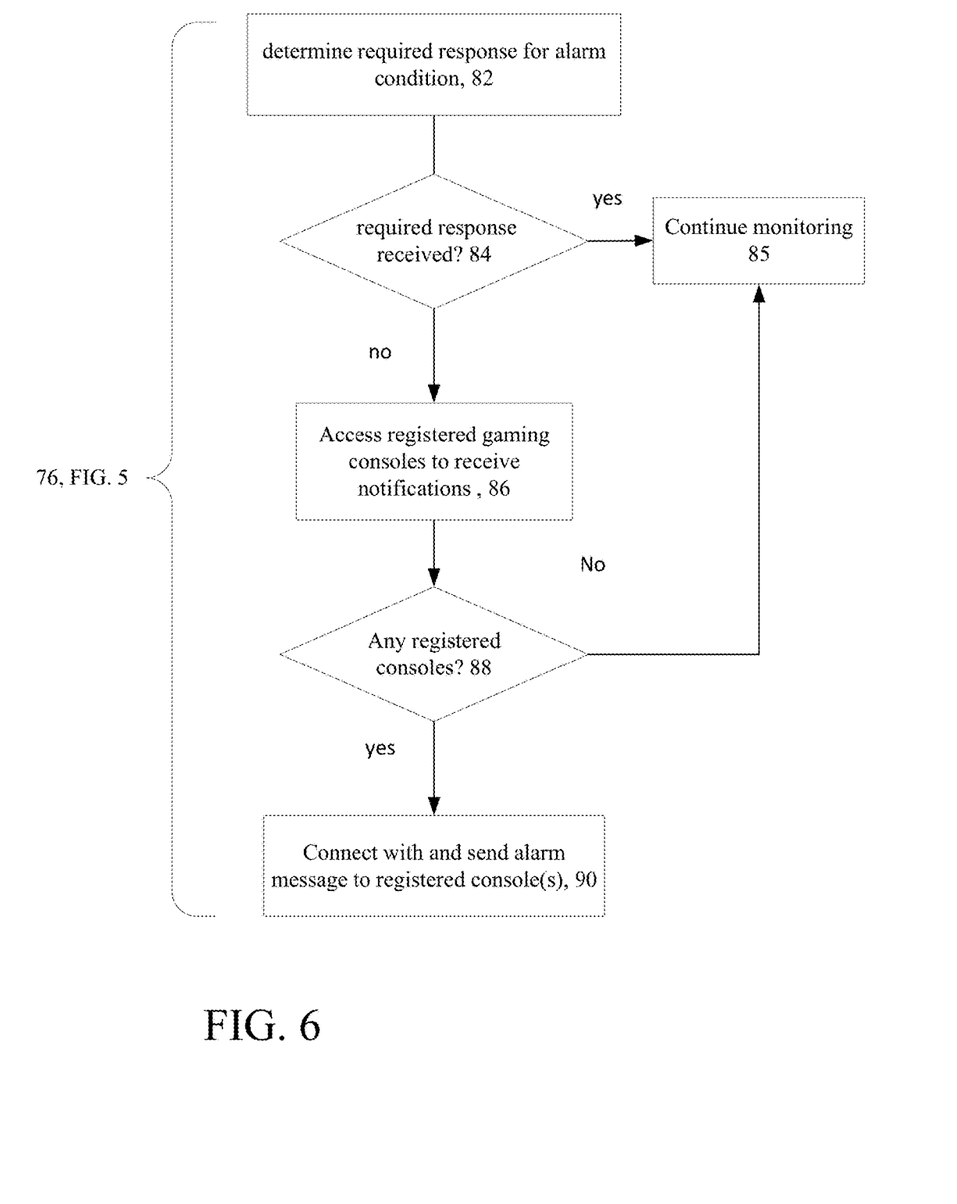

Referring now to FIG. 6, the application 50 applies rules 76 to the alarm condition. The application determines whether a response is needed from the user. As the game console directly accesses the user's television and/or monitor the application can await a user command such as receipt of speech or gesture based actions on the received alarms/notifications. The application whether or not it receives a response, continues monitoring 85. If the application determines that the user has not sent a command the application 50 can await an input from the command center (not shown). As the security system is typically sending messages directly to the command center and the command center generally informs the user on conditions, on whatever available platform a user would have registered, but in case a user is using the game console for home entertainment, then the game console one could be used as the platform on which the user is notified by the control center. Video systems coupled to the game console could be used to relay live video support record/playback video to the command center and the user via the monitor/television.

Figure 7:
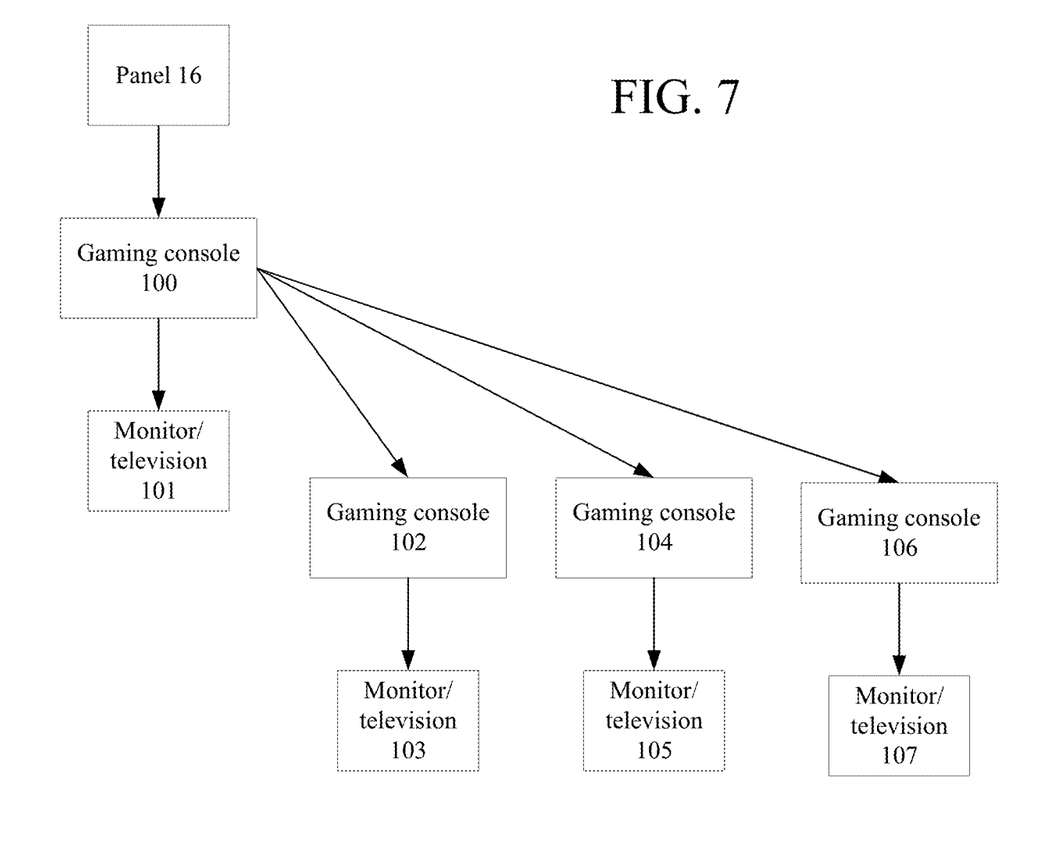
FIG. 7 is a block diagram of an architectural layout of multiple consoles.

Referring now also to FIG. 7, many game consoles offer a user the ability to connect with online "friends." The application 70 takes advantage of this functionality by configuring the game console 100 (FIG. 7) that is coupled to monitor/television 101 to access 86 game consoles 102, 104, 106 (FIG. 7) of friends, typically neighbors or those close by, which have been registered by a user of the game console 100 (FIG. 7) to receive security notifications generated by or based on data from the panel 16 (FIG. 7) and cause these notifications to be displayed on display devices, e.g., monitors, televisions 103, 105 and 107.

Returning back to FIG. 6, the application determines 88 if there are any registered game consoles. If there are, the game console connects 90 with pushes critical alarm notifications to registered friend game consoles 102, 104 and/or 106 when a notification is not received from the game console 100 or in addition to receiving the notification in order to allow both the user and friends to verify the condition. On the other hand if there are not any registered game consoles the application continues monitoring 85 and/or takes other actions such as contacting the monitoring station or another device of the user.

Game consoles offer the ability to find "friend" consoles for an online game. As a user builds a list of consoles by sending and accepting requests from a friend list, a friends' profile information is provided, including motto, name, location, and bio. The process to send a request typically has a user sign into a web service such as for the Xbox, "Xbox Live." From a user account a user can add a friend and enter a "gamertag," i.e., a username of the person to send an invite to. In some implementations of a game console, the process or building a list of consoles can be modified to allow a user to specify a "game" to play online with the other console. This game would be the application and thus would allow only certain individuals in the list to be registered for receiving security messages from the security system.

Figure 8:
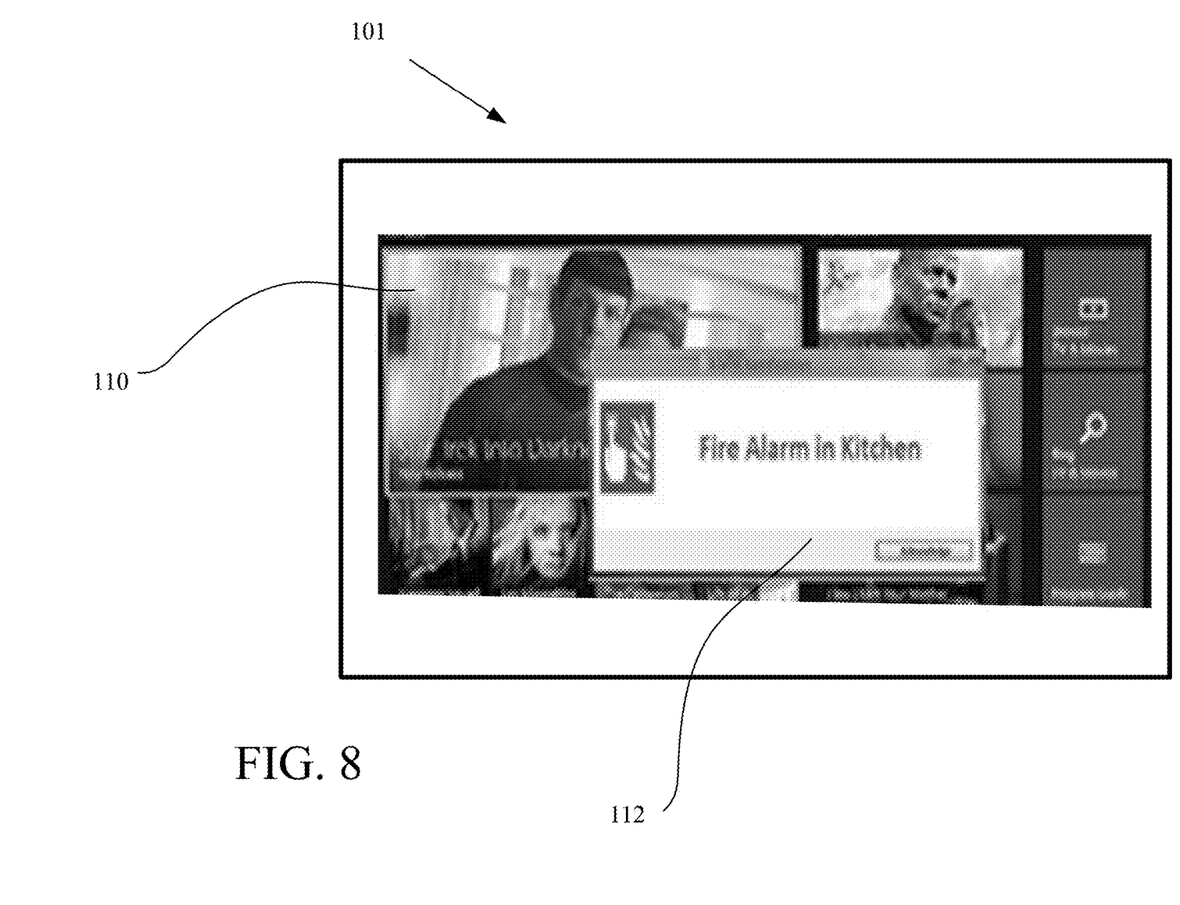
FIG. 8 is a depiction of a display.

Referring now to FIG. 8 a display depicts entertainment, e.g., steaming video or a game that is produced by the game console 30 during normal use. As some point during display of the entertainment 110, the display 101 also displays as an overlay a message 112 that was generated by the panel, 16, monitoring station 18 or the game station 30, which message indicates a security alert "Fire Alarm in Kitchen." Other messages can be subsequently be generated by the panel, 16, monitoring station 18 or the game station 30. For example, the game station can generate subsequent messages to indicate how the user should reply to the message 112 so as to clear the warning or elevate the warning to the monitoring station 18.

Specific Use Cases

False Alarms Verification

In the above description, the game console is continuously connected to all the home devices and video cameras. The game console in conjunction with other sensors could be used to help filtering false alarms reported by the security system, e.g., when a sensor fails and starts generating intrusion messages when there are none. Thus, instead of sending messages directly to the command center, the application 70 on the game console could analyze the alarm via verifying with a camera present in that zone to find whether there is really an intrusion or not.

Controlling HVAC and Lighting

In the above description, the application on the game console could be modified to control HVAC (heating, ventilation, and air conditioning) systems, and lighting systems based on a people counter or thermal imaging. Again as the game console is continuously connected to all of the devices analytics can be executed by the application to use the game console as a system that controls HVAC and/or lighting based a count of the number of people present in a respective zone, again using the cameras that support thermal imaging capabilities, to derive a person count. The count is provided as a parameter in an algorithm that controls the temperature of an HVAC system.

Supporting Multiple Types of Distress Codes

Game consoles support various voice commands and gestures. Thus, in case of a family emergency various distress codes could be specified by users and programed into the application to allow the game console to identify the commands and gestures and report incidents to the control center. For example, the user can generate or pre-defined distress codes can be provided in the application for various conditions, burglar, fire, falls by elderly or physically challenged users, etc.

Video Door Phone

Game consoles can receive audio and video thus if a visitor comes to a house and an occupant of the house is busy watching TV, with the presence of either an intercom and/or door access control with camera, then the visitor could directly call into user and that call could be directly relayed on to the game console to allow the user and visitor to communicate.

Other Use Cases

Game consoles allow users to add friends as discussed above. A user could authorize a game console's user's "friends" to monitor the health of that game console. If the user permits, promotional updates could be pushed onto the respective game console regarding products installed with the game console. The game console could be used to connect to home based public address system, which could be operated remotely, for e.g. in case of fire or in case of emergency.

Customer service could be provided by remote support from the hardware vendor in case there are any issues with the installed hardware at the premise or any critical firmware upgrades needed to be pushed to the devices present in the premises.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Program instructions stored in the memory, along with configuration data may control overall operation of the panel.

A monitoring server at the central monitoring station includes one or more processing devices (e.g., microprocessors), a network interface and a memory (all not illustrated). The monitoring server may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enables each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims. Any of the various available game consoles could be used as the disclosed game console and the application loaded on the game console similar to a game application. Nevertheless, it will be understood that various modifications may be made without departing from the spirit and scope of the invention. Accordingly, other embodiments are within the scope of the following claims.

What is claimed is:

1. A security system comprising:
   a plurality of sensor devices that detect various security-related conditions in a premises, with the plurality of sensor devices configured to produce sensor signals;
   a security system control panel coupled to the plurality of sensor devices, the security system control panel configured to receive the produced sensor signals and execute one or more security-related algorithms to determine presence of one or more security-related alarm conditions based on the received sensor signals and configured to produce an alarm condition message;
   a monitor device; and
   a game console coupled to the security system control panel and to the monitor, with the game console including a processor and memory, a graphics processor, and a network interface, with the game console configured to:
   generate a monitor interface including entertainment content
   cause the monitor device to display the monitor interface;

receive the produced alarm condition message from the security system control panel;
generate a message regarding the one or more security-related alarm conditions and update the monitor interface by overlaying the message on at least a portion of the entertainment content of the monitor interface;
cause the monitor device to display the updated monitor interface; and
receive a confirmation message from a user input device, which confirmation message indicates that the message regarding the one or more alarm conditions was observed being displayed on the monitor.

2. The system of claim 1 wherein the security system control panel comprises:
a processor and memory that are configured to determine from the sensor signals received by the security system control panel from the plurality of sensor devices the presence of the alarm condition.

3. The system of claim 1 wherein the security system control panel is further configured to:
receive the sensor signals from the plurality of sensor devices;
continually process the sensor signals to detect the presence of the alarm condition; and upon detection of the alarm condition,
analyze other received sensor signals against the detected alarm condition to determine the validity of the detected alarm condition.

4. The system of claim 1 wherein the security system control panel is further configured to:
send the produced alarm condition message as a notification to a central monitoring station; and
send the produced alarm condition message to the game console, with the produced alarm condition message sent to the game console including information that identifies the alarm condition by the location in the premises where the alarm condition was detected based on a sensor device of the plurality of sensor devices that triggered the alarm condition.

5. The system of claim 1 wherein the game console is further configured to:
receive video data from the graphics processor, and
display the received video data from the video system on the monitor.

6. The system of claim 1 wherein the game console is further configured to:
determine if the game console has other registered game consoles; and
push critical alarm notifications to those other registered game consoles.

7. The system of claim 1 wherein when the confirmation message is not received from the game console, the game console is further configured to:
determine if the game console has other registered game consoles, and
push critical alarm notifications to those other registered game consoles.

8. The system of claim 1 wherein the message regarding the one or more security-related alarm conditions is a window comprising a text message describing a security event.

9. A method comprising:
receiving sensor data provided from a security system that comprises a plurality of sensor devices that detect various conditions in a premises and a security system control panel coupled to the plurality of sensor devices;
executing by the security system control panel one or more algorithms to determine the presence of an alarm condition from the sensor data and generate an alarm condition message based on detecting a determined alarm condition; and
sending by the security system control panel, the generated alarm condition message to a game console that is coupled to a monitor, the game console including a processor and memory, and a graphics processor, and interfaces to a network to configure the game console to display the generated alarm condition message on the monitor overlaying the generated alarm condition message on at least a portion of entertainment content of the monitor; and
receiving by the game console, a confirmation message from a user input device, which confirmation message indicates that the generated alarm condition message was observed on the monitor.

10. The method of claim 9 further comprising:
determining by the security system control panel from the data received by the security system control panel from the plurality of sensor devices the presence of the alarm condition.

11. The method of claim 9 further comprising:
receiving by the security system control panel the sensor data from the plurality of sensor devices;
continually processing the sensor data to detect the presence of the alarm condition; and upon detecting the alarm condition,
analyzing other received sensor data against the detected alarm condition to determine the validity of the detected alarm condition.

12. The method of claim 9 further comprising:
sending the generated alarm condition message as a notification to a central monitoring station; and
sending the generated alarm condition message to the game console, with the generated alarm condition message sent to the game console including information that identifies the alarm condition by the location in the premises where the alarm condition was detected based on a sensor device of the plurality of sensor devices that triggered the alarm condition.

13. The method of claim 9 further comprising:
determining if the game console has other registered game consoles; and
pushing critical alarm notifications to those other registered game consoles.

14. The method of claim 9, the method further comprises determining whether the confirmation message pertaining to the generated alarm condition message has not been received by the game console;
determining by the game console if the game console has other registered game consoles; and
pushing critical alarm notifications to those other registered game consoles.

15. A system comprising:
a security system including:
a plurality of sensor devices that detect one or more security related conditions in a premises and produce corresponding output data;
a security system control panel configured to:
receive the output data from the plurality of sensor devices;
execute one or more security algorithms to detect presence of an alarm condition based on processing of the output data from the plurality of sensor devices; and generate a detection message that includes an identification of the detected alarm condition;
a monitor display device; and
a game console coupled to the security system control panel and to the monitor display device, the game console comprising:
a processor device;
a memory coupled to the processor;
a graphics coprocessor;
a network interface; and
a computer storage device that stores instructions to configure the game console to:
generate a monitor interface including entertainment content
cause the monitor device to display the monitor interface;
receive the detection message from the security system control panel;
generate a message regarding the one or more security-related alarm conditions and update the monitor interface by overlaying the message on at least a portion of the entertainment content of the monitor interface;
cause the monitor device to display the updated monitor interface; and
receive a confirmation message from a user input device, which confirmation message indicates that the display message was observed being displayed on the monitor.

16. The system of claim 15 wherein the security system control panel is further configured to:
send the detection message as a notification to a central monitoring station.

17. The system of claim 16 wherein the game console is continuously connected video cameras and is further configured to:
filter false alarms reported by the security system by an application on the game console analyzing the alarm condition by analyzing video information from a video camera to verify the alarm condition.

18. The system of claim 15 wherein the game console is a first game console and is further configured to:
determine if the first game console received the confirming message;
determine whether the detection message is a critical alarm notification; and when the detection message is a critical alarm notification,
push critical alarm notification to other game consoles that are registered with the first game console.

19. The system of claim 15 wherein the game console is further configured to:
determine if the game console has registered game consoles;
determine whether the detection message is a critical alarm notification; and when the detection message is a critical alarm notification,
push critical alarm notifications to other game consoles that are registered with the first game console.

20. The system of claim 15 wherein the display message from the game console identifies the alarm condition by the location in the premises where the alarm condition was detected based on a sensor device of plurality of sensor devices that triggered the alarm condition.

* * * * *